Patented Dec. 7, 1948

2,455,703

UNITED STATES PATENT OFFICE 2,455,703

PROCESS OF PURIFYING NUCLEAR-CHLORINATED BIS-PHENOLS BY STEAM DISTILLATION

Louis F. Reuter, Elyria, Ohio, assignor to The B. F. Goodrich Company, New York, N. Y., a corporation of New York No Drawing. Application September 17, 1946, Serial No. 697,595

2 Claims. (Cl. 202—46)

1

This invention relates to the purification of high molecular weight chemical compounds and pertains more specifically to the purification of nuclear-chlorinated alkylidene bis-phenols.

Nuclear-chlorinated alkylidene bis-phenols as usually prepared are highly discolored and quite impure. They have heretofore been purified by vacuum distillation to obtain lighter colored products which are useful in chemical synthesis as in the preparation of high molecular weight polyesters. However, the products purified by the vacuum distillation process are unstable and become highly colored upon storing for a few days. In addition, vacuum distillation of the nuclear-chlorinated alkylidene bis-phenols has been found to decompose the bis-phenol with concomitant formation of large amounts of tarry residue. Moreover, high molecular weight polyesters prepared from vacuum distilled nuclear-chlorinated alkylidene bis-phenols become discolored rather easily upon standing.

Accordingly, it is an object of this invention to provide a method of purifying nuclear-chlorinated alkylidene bis-phenols so that water-white stable products may be produced efficiently and economically, without the disadvantages of the vacuum distillation process.

I have now discovered a new method of purifying nuclear-chlorinated alkylidene bis-phenols by a steam distillation process conducted above the boiling point of water, from which water-white highly-purified products are obtained which are stable to color change in storage for weeks, months, or a year or more. I have discovered that the nuclear-chlorinated alkylidene bis-phenols may be heated so as to be maintained in a molten state and superheated steam passed into the melt whereupon the bis-phenol rapidly distills leaving the highly colored residue in the distillation vessel. Moreover, I have discovered, surprisingly, that the nuclear-chlorinated alkylidene bis-phenols may be steam distilled without hydrolysis or decomposition and obtained with high yields in a relatively pure form suitable for preparation of water-white unsaturated polyesters which are useful in the production of polymeric materials of a high degree of hardness and clarity and exceedingly stable to discoloration.

Any of the nuclear-chlorinated alkylidene bis-phenols may be purified and rendered water-white in appearance by the method of this invention. The nuclear-chlorination may be performed by the methods described by Zincke et al., Ann. 343, 75–131 (1905) or by Moss, British Patent No. 491,792; or if desired, they may be prepared by condensing a previously chlorinated phenol with a ketone in the usual manner. Among the materials which may be used are: 2,2-bis-(3-chloro-4-hydroxyphenyl) propane prepared by reacting o-chlorophenol with acetone; 2,2-bis-(2,3-dichloro-4-hydroxyphenyl) propane, 2,2-bis-(2,3,5-trichloro-4-hydroxyphenyl) propane; 2,2-bis-(2,3,5,6-tetrachloro-4-hydroxyphenyl) propane; 3,3-bis-(3-chloro-4-hydroxyphenyl) pentane; bis-(3-chloro-4-hydroxyphenyl) dipropyl methane; and others as are represented by the following general formula:

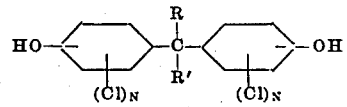

in which R and R' are hydrogen or alkyl groups and N is a number less than 5. Although as many as four chlorine atoms may be introduced into each of the phenolic nuclei of such a compound, products having only one or two chlorine atoms in each of the nuclei are preferred in this invention because of their lower melting points.

The invention will now be described with reference to specific examples showing preferred manners of carrying out the invention.

A charge of crude 2,2-bis-3-chloro-4-hydroxyphenyl propane which was reddish in color, and which melted at 82 to 85° C. was steam-distilled to produce a water-white material melting at 88.5 to 89.5° C. 3800 grams of the discolored compound were charged in the powdered form to a distillation vessel along with 50 grams of powdered calcium carbonate. The charge was melted and warmed to a temperature of about 140 to 150° C. when a stream of steam superheated to 210 to 220° C. was continuously introduced under the surface of the melt through a dip pipe. The temperature of the melt was thereby raised rapidly to 185 to 195° C. by the introduction of the steam, at which point distillation started. The distillation vapors were passed through a packed tower to trap intrained impurities and then to a water-cooled condenser maintained at temperature sufficient to just condense the product (i. e. above the melting point of 75 to 80° C.) and the remaining watery vapor passed to a colder condenser where the water vapors were condensed.

After distillation was started the temperature of the distillation vessel was gradually raised to 230 to 235° C. over a period of 30 minutes. A considerable portion of the forerunnings constituting 2.9% of the total charge was collected during the early period, and found to contain considerable unstable material which colored such sample upon storage for a few days. However, the main fraction constituting 91% of the total charge was found to be exceedingly stable for it remained water-white for as long as a year and more.

The watery portions and the oily portions of the distillate were collected in a common receiver. The watery layer was continuously removed from the receiver by means of a simple siphon arrangement with the mouth of the siphon located some distance below the water surface since the oily drops entering the receiver had a tendency to float on the water surface for a while before coalescing into larger droplets, which then sank to the bottom of the receiver. In this manner a clean separation was achieved. The product distilled over at a rate of 450 grams per hour at this temperature and the water condensate distilled over at a rate of 1500 to 1800 grams per hour or a ratio of water condensate to distillate of approximately 4 to 1. The product still in the melted condition was intermittently removed from the receiver into aluminum trays and allowed to crystallize. If desired, the product may be subsequently treated to remove a small portion of dissolved water, preferably by chemical drying agents such as potassium carbonate, because prolonged heating tends to unstabilize and discolor the product. However, it has been found that the wet product tends to be slightly more stable, especially if the product is stored under water. Moreover, for the purposes of further chemical synthesis, the small proportion of dissolved or occluded water constituting only 3 to 5% of the product is not objectionable.

After the distillation had progressed to the point where the oily layer of the distillate began to show signs of color, the distillation was terminated and the highly discolored residue remaining in the flask was found to constitute only 5.9% of the total crude reaction mixture charged to the vessel.

Similar distillations revealed that the maximum safe distillation temperature was below 250° C., preferably at about 230 to 235° C. At temperatures of 250° C. or more, the rate of distillation nearly doubles and the ratio of condensed steam to distillate was reduced to about 2 to 1. However, at the higher temperatures of 250° C. or more, the distilled product tended to be slightly discolored, the distilled product was found to be unstable in storage, and a great deal more residue was left in the distillation vessel after such high-temperature distillation.

The rate at which steam could be introduced into the distillation vessel was limited only by the physical factors of entrainment and ebullition. Too rapid a steam rate resulted in a brown-colored distillate due to entrainment of the impure material splashed from the reaction vessel. Moreover, at higher steam rates, the ratio of condensed water to distillate was increased with little increase in distillation rate. Lower steam temperatures of 210 to 220° C. were entirely satisfactory, in fact, temperatures down to 185° C. were satisfactory, but the distillation rate was much reduced, it being for example, 250 to 300 grams per hour at 210 to 220° C.

2,2-bis-(3-chloro-4-hydroxyphenyl) propane colors quickly in contact with iron, stainless steel, etc., and the product also colors slightly in contact with enamel-covered ware, presumably due to extraction of iron from the enamel. Aluminum and Pyrex glass were found to be entirely satisfactory materials for handling the steam-distilled, water-white bis-phenols.

The presence of soluble salts such as sodium hydroxide, soluble carbonates and acetates tended to accelerate the decomposition of the bis-phenol to ortho-chlor-phenol. Calcium hydroxide or calcium carbonate, however, tended to stabilize the hot melt in the distillation vessel, probably because they maintained an alkaline medium without the formation of soluble salts. Other water-insoluble basic inorganic salts could be used in place of calcium hydroxide or calcium carbonate with equivalent results. However, distillation of the bis-phenol was accomplished with the production of excellent quality distillate without the presence of such a material. But to reduce the decomposition, the presence of calcium carbonate or equivalent material in the distillation vessel is preferred.

To the residue in the distillation vessel remaining after the distillation first described subsequent portions of 3800 grams of the same crude chlorinated bis-phenol were added and the distillation continued without allowing the distillation vessel and its contents to cool down appreciably. The first distillate was water-white and of an excellent degree of chemical purity. The residue after each addition of crude was found to constitute only 5 to 6% of the total crude bis-phenol charged.

The distillates purified by the method of this invention were tested by using them for the production of high-molecular weight unsaturated polyesters, which later were polymerized to form glass-like clear polymers suitable for molding and casting operations, all in the manner more fully disclosed in the copending application of James A. Bralley and Frank B. Pope, Serial No. 579,163, filed Feb. 21, 1945. For example, to a solution of 445 parts by weight of the 2,2-bis-(3-chloro-4-hydroxyphenyl) propane purified by the method of this invention and 371 parts of allyl chloroformate in 400 parts of acetone, there was added slowly and with constant stirring a solution of 128 parts of sodium hydroxide in 300 parts of water while maintaining the temperature of the reaction mixture at about 0 to 10° C. An additional 550 parts of water were added during the course of the reaction to dissolve the sodium chloride formed during the reaction. The mixture was stirred for about two hours after the last of the sodium hydroxide solution had been added to insure completion of the reaction. The acetone solution was then separated from the aqueous salt solution, washed by the solution of 175 parts of sodium chloride in 850 parts of water, and dried. The acetone was evaporated at reduced pressure leaving 669 parts (96% of theoretical amount) of the desired diallyl 2,2-bis-(3-chloro-4-hydroxyphenyl) propane dicarbonate.

To the monomeric diallyl 2,2-bis-(3-chloro-4-hydroxyphenyl) propane dicarbonate prepared above there was added about 1.0 to 1.5 parts by weight of benzoyl peroxide catalyst and the liquid was then poured into a closed vessel and warmed to drive off trapped air. The de-aired monomer was held to 75° C. for a period of 16 to 24 hours whereupon the monomer was converted to a crystal-clear glass-like transparent polymer. First gelling was observed to have occurred in 80 to 120 minutes.

Vacuum-distilled nuclear-halogenated alkylidene bis-phenols were converted to high-molecular weight unsaturated polyesters by the above-described method but the resulting polyesters were not water-white. In fact, the polyesters produced from the best vacuum-distilled bisphenols were of straw color and the polymers produced therefrom were colored from straw color to pink.

Any nuclear-chlorinated alkylidene bis-phenols may be purified in the manner described to produce water-white products which are not discolored upon standing and which may be used to prepare colorless monomeric and polymeric polyesters. Accordingly, it is not intended to limit the invention solely to the specific examples, but to include all of the obvious variations and modifications falling within the spirit and scope of the appended claims.

I claim:

1. The process of purifying a crude nuclear-chlorinated alkylidene bis-phenol, which comprises maintaining the crude phenol in the molten state at a temperature in excess of 100° C. but less than 250° C., passing steam superheated to a temperature greater than 185° C. but less than 250° C. into said molten crude, and condensing the vapors evolved.

2. The process of purifying crude 2,2-bis-(3-chloro-4-hydroxyphenyl) propane which comprises maintaining the crude phenol in the molten state at a temperature in excess of 100° C. but less than 250° C., passing steam superheated to a temperature greater than 185° C. but less than 250° C. into said molten crude, condensing the vapors evolved, and separating the oily layer comprising the purified 2,2-bis-(3-chloro-4-hydroxyphenyl) propane from the watery layer.

LOUIS F. REUTER.

REFERENCES CITED

The following references are of record in the file of this patent:

UNITED STATES PATENTS

| Number | Name | Date |
| --- | --- | --- |
| 1,372,477 | Bodman | Mar. 22, 1921 |
| 1,439,685 | Bodman | Dec. 26, 1922 |
| 1,835,063 | Langmeier | Dec. 8, 1931 |

OTHER REFERENCES

Morton "Laboratory Technique in Organic Chemistry," published 1938 by McGraw-Hill Book Company, Inc., pages 144, 145. (Copy in Div. 25.)